United States Patent

Griffiths

[15] 3,674,696
[45] July 4, 1972

[54] GASEOUS DIELECTRIC MATERIALS
[72] Inventor: James Edward Griffiths, Murray Hill, N.J.
[73] Assignee: Bell Telephone Laboratories, Incorporated, Murray Hill, N.J.
[22] Filed: Dec. 30, 1970
[21] Appl. No.: 102,706

[52] U.S. Cl..............................252/63.7, 174/15, 200/149, 252/66, 310/55, 333/95, 336/94
[51] Int. Cl.......................................................H01b 3/18
[58] Field of Search................252/63.7, 66; 174/15; 336/94; 317/244; 310/55; 200/149; 333/95

[56] References Cited

UNITED STATES PATENTS 2,211,019  8/1940  Lommel................................252/63.7
2,221,671  11/1940  Cooper..................................252/66

*Primary Examiner*—Alfred L. Leavitt
*Assistant Examiner*—Janyce A. Bell
*Attorney*—R. J. Guenther and Edwin B. Cave

[57] ABSTRACT

Materials are described which are useful as gaseous dielectric insulators in electrical devices. These materials are a group of sulfur compounds which have two fluorine atoms and at least one perfluoroalkylimino group attached to the sulfur atom. It has been discovered that the substitution of a perfluoroalkylimino group for an oxygen atom attached to a sulfur atom increases the dielectric breakdown voltage of the molecule. These gaseous materials can be used both in substantially pure form or mixed with inert gaseous material. They exhibit high breakdown voltages and in addition do not yield undesirable reaction products when exposed to dielectric breakdown.

9 Claims, 5 Drawing Figures

INVENTOR
J. E. GRIFFITHS
BY
ATTORNEY

WAVEGUIDE 25

VAPOR PHASE

GASEOUS DIELECTRIC MATERIALS

BACKGROUND OF THE INVENTION

1. Field of the Invention

The invention relates to gaseous dielectric materials and electrical devices which make use of these gaseous dielectric materials.

2. Description of the Prior Art

Many electrical devices use separation of conductors to achieve electrical insulation. In these devices atmospheric air is used as the dielectric insulator to prevent conduction between these separated electrical conductors. For many cases, especially where large voltage gradients are not involved, atmospheric air serves perfectly well as the dielectric insulating material.

In electrical devices where large voltage gradients are present, dielectric breakdown is often a problem. Further separation of the conductors or the use of solid dielectric insulation is often precluded by other considerations, such as device design and heat dissipation problems. In these cases the use of gaseous materials with substantially higher dielectric breakdown voltages than air is often advantageous. Examples of electrical devices which might require the use of gaseous dielectric materials are electric generators, electric transformers, electrical switching apparatus, cables, and waveguides.

The importance of high breakdown voltages in gaseous dielectrics is particularly well illustrated in the case of waveguides used in radar transmitters. Here, the range of the radar apparatus depends strongly on the power of the transmitted radar signal. This power is often limited by dielectric breakdown in waveguides used to feed the radar antenna. Indeed, the power is proportional to the square of the electric fields set up in the waveguide. Thus doubling the electric field increases the maximum power which can be supported by the waveguide without dielectric breakdown by a factor of 4. For this reason, the use of a gaseous material with dielectric breakdown voltages considerably larger than now available would greatly increase the range and usefulness of presently available radar equipment without substantial change in presently available equipment of great economic penalty.

Similar conditions can be applied to other electrical devices, especially where miniaturization and space considerations are of importance.

Typical substances which have been used in the past as gaseous dielectrics have been $SF_6$ and $SO_2$. These substances have limited dielectric breakdown voltages and in addition often yield undesirable breakdown products when dielectric breakdown takes place. For example, $SF_6$ yields a material which often decreases the conductivity of switching contacts and increases microwave losses in waveguides. Thionyl fluoride, $SOF_2$, has also been suggested for use as a dielectric gas. Although this compound has improved dielectric breakdown characteristics over $SF_6$ and $SO_2$ and does not yield undesirable products on breakdown, still further improvement in dielectric breakdown characteristics is desirable so as to permit greater miniaturization of electrical devices and smaller spacing between portions of a device which are biased relative to each other.

SUMMARY OF THE INVENTION

The invention is electrical devices in which certain gaseous materials are used as dielectric insulators in either substantially pure form or in combination with other inert gases. Selection of the dielectric gases is based on the discovery that the substitution of perfluoroalkylimino groups for an oxygen group in a sulfur oxyfluoride compound increases the dielectric breakdown voltage. Specifically the substitution of a perfluoroalkylimino group for the oxygen group in $SOF_2$ yields a compound with the general formula $SN(R)F_2$ which has superior dielectric properties such as higher breakdown voltage. The perfluoroalkyl group designated by R in the general formulas given in this application may have up to three carbon atoms. Greater than three carbon atoms in the perfluoroalkyl group will yield compounds which do not remain gaseous under conditions in which electrical devices operate. For example, the breakdown voltage of $SN(CF_3)F_2$ was shown to be significantly greater than $SOF_2$. In addition, the compound sulfuryl fluoride $SO_2F_2$ has been found to exhibit the desirable dielectric properties. The substitution of a perfluoroalkylimino group for either one or both of the oxygens in $SO_2F_2$ also yields compounds with desirable dielectric properties. These compounds are $SN(R)OF_2$ and $S(RN)_2F_2$. Examples of a compound from each group are trifluoromethylimino thionyl fluoride, $SN(CF_3)OF_2$ and bis-(trifluoromethylimino) sulfur difluoride $S(NCF_3)_2F_2$ and corresponding ethyl and propyl derivatives. While the invention is described in terms of substituting a perfluoroalkylimino group for an oxygen group in a sulfur oxyfluoro compound, it is understood that any convenient method of preparation may be used to prepare the inventive compound.

There are a large variety of electrical devices in which these dielectric gases could be used. These include condensers, generators, transformers, electric cable, switching apparatus and waveguides, to name a few.

It should be understood that these dielectric gases can either be used in substantially pure form or mixed with other inert gases. For example, in devices where only a modest improvement in breakdown voltage is required, small amounts of the inventive dielectric gases might be mixed with air. Typically 10–100 percent by volume of the dielectric gas is used. Also, other additional inert gases are used either because of their improved dielectric characteristics or for more efficient cooling of the electrical apparatus. Such gases are nitrogen, helium, carbon dioxide and hydrogen, to name a few.

DETAILED DESCRIPTION

1. Glossary of Compounds

For convenient reference, some of the compounds referred to in the disclosure are given below. The compounds are identified by their structural formulas and molecular formulas as well as by their common names.

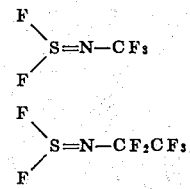

| | | |
|---|---|---|
| | $SN(CF_3)F_2$ | Trifluoromethylimino sulfur difluoride. |
| | $SN(C_2F_5)F_2$ | Pentafluoroethylimino sulfur difluoride. |

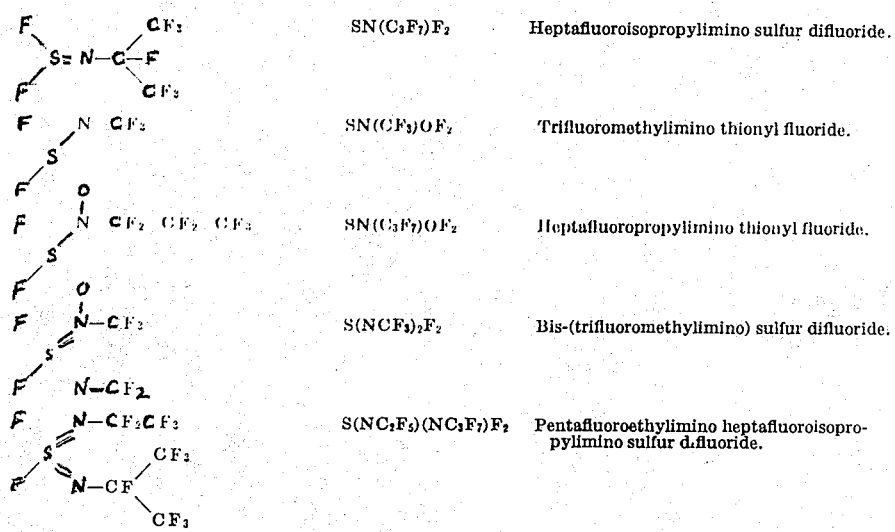

2. Breakdown Voltages

Dielectric gases are used primarily for insulating purposes in electrical devices. Other possible uses are for cooling purposes or to alter the dielectric response to a particular electrical signal. Breakdown voltages are a convenient measurement of the effectiveness of dielectric gases used for insulating purposes.

The breakdown voltages were measured using an evacuable glass cell containing parallel-plate electrodes made of nickel. One electrode was stationary and the other was movable so that electrode separation could be varied. Care was taken to maintain a uniform field between the electrodes. Thus the diameter of the electrodes was for all measurements greater than 10 times the electrode separation. Also, the edges of the electrodes were rounded so as to eliminate any sharp edges in the electrode configuration which might lead to non-uniform electric fields. Electrode separations varied in these experiments from about 80 mils to about 10 mils. The pressure was varied from approximately atmospheric pressure down to approximately 10 torr. Over this range the voltage breakdown was found to approximate Paschen's Law in that the voltage breakdown depended only on the product of gas pressure and electrode separation. Data on breakdown voltage was obtained by setting the electrodes at a given separation, introducing the dielectric gas into the gas cell at a pressure near atmospheric pressure and then slowly increasing the voltage on the electrodes until breakdown occurred. The pressure of the dielectric gas was then reduced and the voltage again increased slowly to where breakdown occurred.

Since different dielectric gases can be substituted in the apparatus without changing electrode configuration, the above procedure yielded quite reliable data on the relative breakdown voltages of the gases measured.

Figure 5:
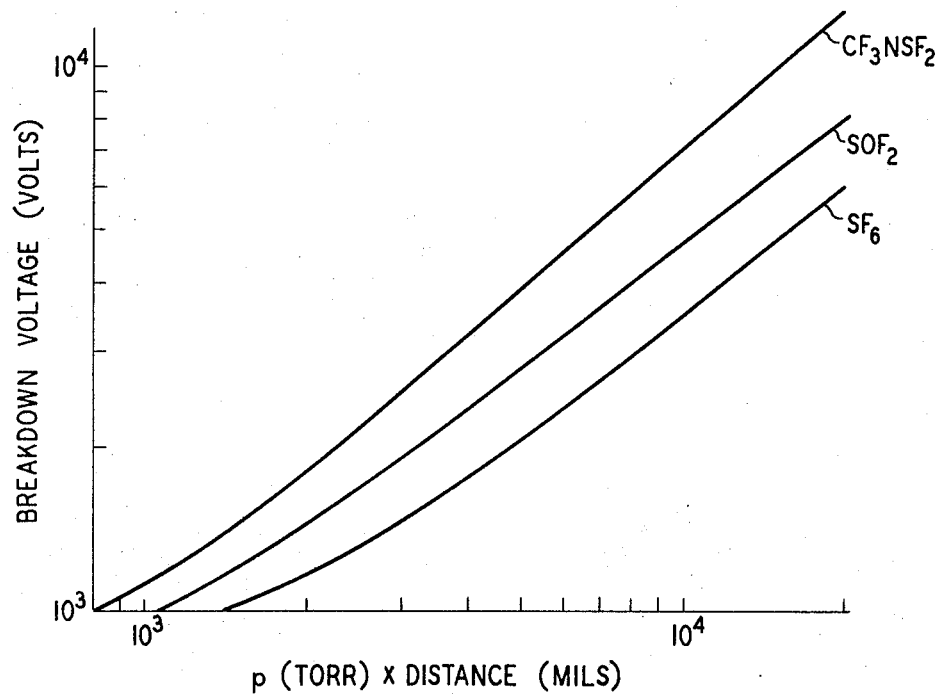
FIG. 5 is a graph showing data on the dielectric properties of several gaseous substances on coordinates of dielectric breakdown voltage versus pressure in torr multiplied by electrode separation in mils.

In order to illustrate the advantage of substituting a perfluoroimino group for an oxygen group in a sulfur compound, dielectric breakdown data was taken on two compounds related to one another by this substitution. The sulfur-oxygen compound chosen was thionyl fluoride, $SOF_2$. The substituted compound was trifluoromethylimino sulfur difluoride, $SN(CF_3)F_2$. The results of these measurements are given in FIG. 5. It should be recognized that $SOF_2$ itself has quite high breakdown voltages. In fact, it exceeds in breakdown voltage such well-known dielectric materials as $SF_6$ and $SO_2$. As can be seen from FIG. 5, the substitution of a perfluoroalkylimino group for the oxygen group attached to the sulfur atom improves the dielectric breakdown characteristics of the material. The perfluoroalkyl group may have up to three carbon atoms. Higher homologues may liquify under some of the operating conditions of electrical devices.

The dielectric breakdown voltages of $SO_2F_2$ were also found to be quite desirable. For example, the breakdown voltage of this substance was found to be greater than $SF_6$, an often used standard for dielectric gases. The substitution of a perfluoroalkylimino group for either one or both of the oxygens in $SO_2F_2$ also yields compounds with improved dielectric breakdown characteristics. Again the number of carbon atoms in the alkyl group should be less than four to insure that the dielectric substance remains gaseous under typical operating conditions for the electrical devices. Typical compounds with one or both oxygens replaced by the imino group are trifluoromethylimino thionyl difluoride and bis-(trifluoromethylimino) sulfur fluoride and corresponding ethyl and propyl derivatives.

3. Electrical Devices

Figure 1:
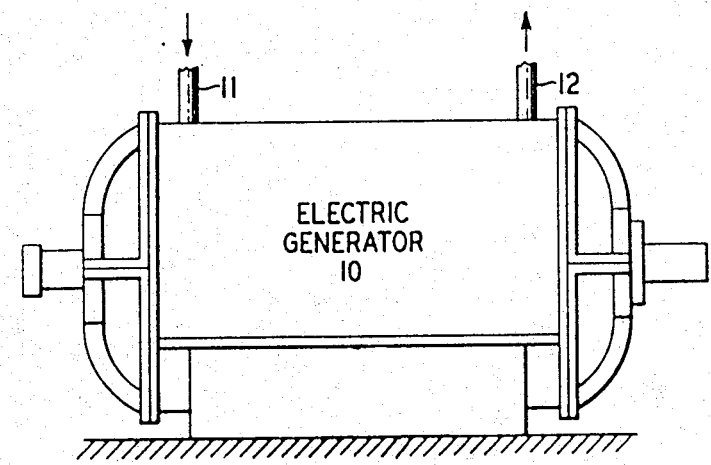
FIG. 1 is a side view of an electric generator with entrance and exit tubes for introducing and removing the dielectric gaseous material.

FIG. 1 shows an electric generator 10 in which provision by way of inlet 11 and outlet 12 tubes has been made to introduce a dielectric gas. This can be done either by continuously allowing the dielectric gas to flow through the electric apparatus, or by sealing the gas in the electrical apparatus. The composition of the dielectric gas might involve just one gas with high breakdown voltage or a mixture of such gas or gases with several inert gases.

Figure 2:
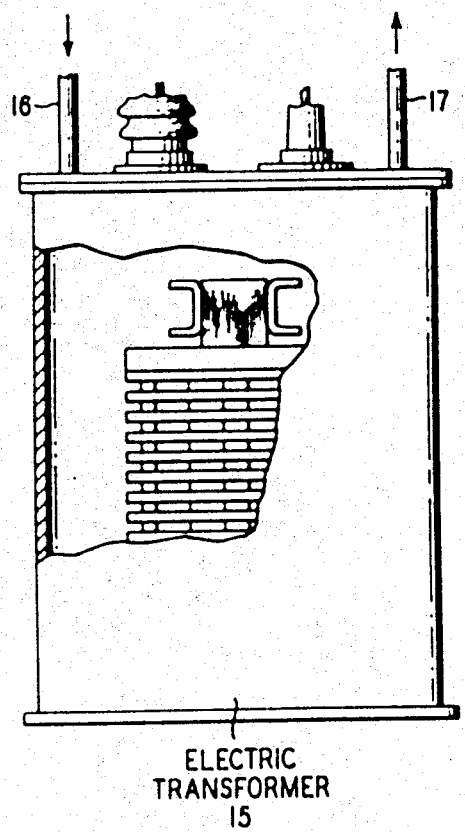
FIG. 2 is a side view of an electric transformer showing entrance and exit tubes for dielectric gaseous material.

FIG. 2 shows a transformer 15 also provided with means of introducing a dielectric gas to improve electrical performance. Inlet 16 and outlet 17 tubes are used to introduce the gas. Again the dielectric gas might be continuously flowed through the electrical apparatus or sealed into the electrical apparatus.

Figure 3:
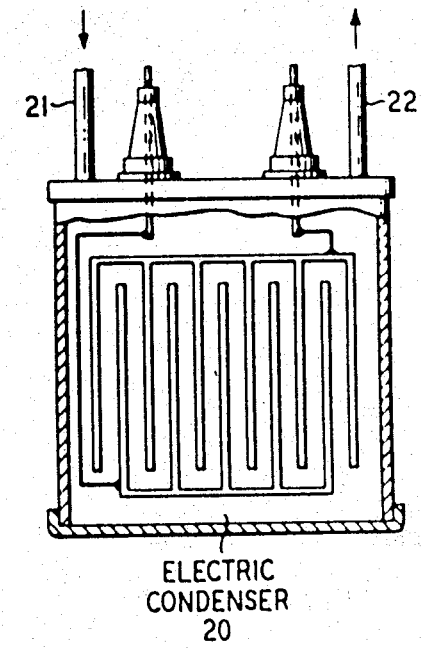
FIG. 3 is a side view of an electric capacitor with entrance and exit tubes for the dielectric gaseous material.

FIG. 3 shows an electrical condenser 20 in which provision in the form of inlet 21 and outlet 22 tubes is made to introduce a dielectric gas.

Figure 4:
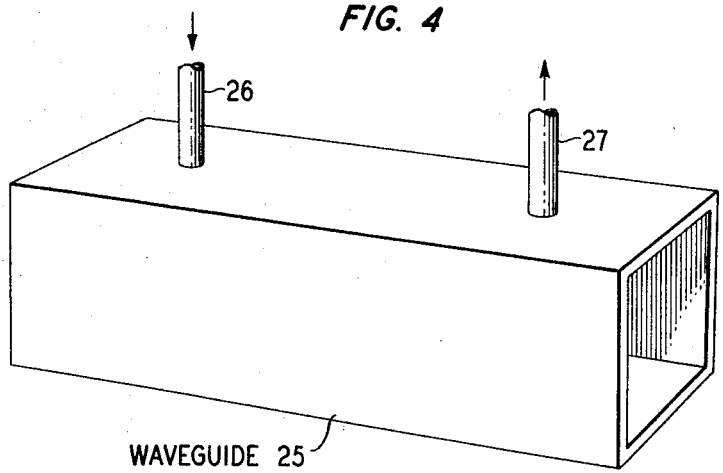
FIG. 4 is a side view of a waveguide with entrance and exit tubes for dielectric gaseous material.

FIG. 4 is a portion of a waveguide 25 in which provision has been made to introduce a dielectric gas. This provision is an inlet 26 and outlet 27 tube. Again the dielectric gas could be continuously flowed through the apparatus or sealed permanently into the apparatus.

Gaseous dielectric materials are also useful in other electrical devices than shown in FIGS. 1 through 4, such as electrical cable, electrical switching devices, etc.

What is claimed is:

1. An electrical apparatus with means for biasing a first portion relative to a second portion in which the interstices between said first and second portions contain a dielectric gas characterized in that the dielectric gas comprises 10–100 percent by volume of a compound selected from the group consisting of $SN(R)F_2$, $SN(R)OF_2$ and $S(NR)_2F_2$ in which the R represents a perfluoroalkyl group with up to three carbon atoms.

2. The electrical apparatus of claim 1 in which the interstices contain from 0–90 percent of a gas selected from a group consisting of nitrogen, helium, air, carbon dioxide and hydrogen.

3. The electrical apparatus of claim 1 in which the first and second portions are physically separated.

4. The apparatus of claim 3 in which the said first and second portions comprise an electric generator.

5. The electrical apparatus of claim 3 in which said first and second portions comprise an electric transformer.

6. The electrical apparatus of claim 3 in which the said first and second portions comprise an electric condenser.

7. The electrical apparatus of claim 3 in which the said first and second portions comprise an electrical switch.

8. The electrical apparatus of claim 1 in which the first and second portions are in D.C. electrical contact.

9. The electrical apparatus of claim 8 in which the said first and second portions comprise a waveguide.

* * * * *